(12) United States Patent
Seibold et al.

(10) Patent No.: US 6,734,841 B1
(45) Date of Patent: May 11, 2004

(54) COLOR DISPLAY HAVING SEQUENTIAL PRIMARY COLOR GENERATION

(75) Inventors: Michael Seibold, Munich (DE); Udo Custodis, Munich (DE); Reinhard Lecheler, Neuburg/Donau (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 88 days.

(21) Appl. No.: 09/762,774

(22) PCT Filed: Jun. 5, 2000

(86) PCT No.: PCT/DE00/01823

§ 371 (c)(1),
(2), (4) Date: Feb. 13, 2001

(87) PCT Pub. No.: WO00/79334

PCT Pub. Date: Dec. 28, 2000

(30) Foreign Application Priority Data

Jun. 18, 1999 (DE) .......................... 199 27 791

(51) Int. Cl.⁷ .......................... G09G 3/36; G02F 1/1335
(52) U.S. Cl. .......................... 345/102; 349/65
(58) Field of Search .......................... 345/87, 88, 90, 345/92, 97, 99, 102; 349/61, 62, 64, 65, 67, 68, 70, 71; 362/31, 561

(56) References Cited

U.S. PATENT DOCUMENTS

| | | | | | |
|---|---|---|---|---|---|
| 4,799,050 A | * | 1/1989 | Prince et al. | ................ | 345/102 |
| 5,128,782 A | * | 7/1992 | Wood | ................ | 345/102 |
| 5,143,433 A | * | 9/1992 | Farrell | ................ | 345/102 |
| 5,337,068 A | * | 8/1994 | Stewart et al. | ................ | 345/102 |
| 5,387,921 A | * | 2/1995 | Zhang et al. | ................ | 345/102 |
| 5,428,366 A | * | 6/1995 | Eichenlaub | ................ | 345/102 |
| 5,461,397 A | * | 10/1995 | Zhang et al. | ................ | 345/102 |
| 6,151,004 A | * | 11/2000 | Kaneko | ................ | 345/102 |
| 6,243,068 B1 | * | 6/2001 | Evanicky et al. | ................ | 345/102 |

FOREIGN PATENT DOCUMENTS

| | | |
|---|---|---|
| EP | 0 604 902 A1 | 7/1994 |
| GB | 2 172 733 A | 9/1986 |
| WO | 94 23442 | 10/1994 |
| WO | 98 43280 | 10/1998 |

\* cited by examiner

*Primary Examiner*—Bipin Shalwala
*Assistant Examiner*—Jeff Piziali
(74) *Attorney, Agent, or Firm*—Robert F. Clark

(57) ABSTRACT

The invention relates to an improved color display with temporary sequential primary color mixing, in the case of which a discharge lamp for dielectrically impeded discharges is used for backlighting.

13 Claims, 4 Drawing Sheets

COLOR DISPLAY HAVING SEQUENTIAL PRIMARY COLOR GENERATION

TECHNICAL FIELD

The invention relates to a color display in the case of which it is possible by using at least two primary colors to represent color images with the aid of mixed colors of the primary colors.

BACKGROUND OF THE INVENTION

Such color displays are required in very many technical applications, for example in monitors for computers or other technical equipment, in television screens for television sets or for telecommunication, in graphic machine displays etc.

In this case, the invention is directed at color displays in the case of which the brightness filter is backlit by a lamp. The brightness filter is spatially controllable, which means that how bright the filter is can be controlled in a spatially resolved fashion. In particular, this relates to the transmission through a brightness filter, but the reflection method can also be concerned. Usually, such brightness filters are liquid crystal devices, that is to say liquid crystal elements with a spatially resolved electric drive, or a system of liquid crystal elements.

In the case of conventional color liquid crystal displays, use is made of two-dimensional white light sources for backlighting and, as in the case of an electron beam color picture tube pixels in the required primary colors are used to produce images which, lacking spatial resolution of the individual pixels by the human eye, produce the impression of a color image with the aid of appropriate mixed colors of the primary colors. In this case, each pixel forms a color filter for the white light of the backlighting. The mixed colors are represented by spatially alternating, but simultaneous representation of the primary colors. It is felt as very disadvantageous that further losses occur over and above the low transmission of the liquid crystal devices owing to the color filtering. Furthermore, the geometrical dimensions of the individual primary color pixels are necessarily smaller than the spatial resolution of the color liquid crystal display, since in each case a set of primary color pixels of each primary color used together form a pixel.

As an alternative to this, color liquid crystal displays have also been developed which replace the spatial interlocking of the primary colors by a temporary sequential method in which the same pixel shines sequentially in the primary colors used with the respectively assigned brightness. The spatial averaging of the human eye in this case also produces the impression of a color image with the aid of appropriate mixed colors of the primary colors.

For this purpose, the backlighting itself must form the temporal sequence of the primary colors. Good results have been obtained with color liquid crystal displays which are backlit by colored light-emitting diode panels. Given the same structural size, it is possible to achieve a better spatial resolution than in the case of the systems previously described; furthermore, the light loss is eliminated by the color filter action of the individual primary color pixels.

SUMMARY OF THE INVENTION

The invention represented here is based on the technical problem of specifying a color liquid crystal display which is improved by comparison with the prior art.

For this purpose, the invention consists in a color display having a spatially controllable brightness filter and a lamp for backlighting the brightness filter, the display being designed for the purpose of producing images in at least two primary colors alternating sequentially in time, in order overall to create the impression of a color image with mixed colors of the primary colors, characterized in that the lamp is a discharge lamp with at least one dielectrically impeded electrode. Thus, according to the invention the basic principle of the temporary sequential superimposition of primary color images is adopted, although instead of backlighting by light-emitting diodes use is made of a discharge lamp which is designed for dielectrically impeded discharges. This discharge lamp has the substantial advantage that although it has a switching endurance comparable to that of light emitting diodes, that is to say can be used given the estimated number of switchings, approximately $10^{10}$ cycles and beyond, to be expected in the service life of a lamp, by contrast with light emitting diode arrangements it can be used without substantial technical problems and in conjunction with very favourable costs even in large formats. Furthermore, very bright background lighting systems can be produced with the aid of dielectrically impeded discharges. Finally, the dielectrically impeded discharges are short lived and can therefore also be switched quickly, with the result that, in particular, it is possible to produce very short switching times in conjunction with recent display systems based on ferroelectric or antiferroelectric liquid crystals.

It is to be noted that in this application the term of spatially controllable brightness filter is used and meant in the most general sense. The liquid crystal devices discussed in more detail below constitute only the application which is currently technically customary in this regard. However, the invention is likewise directed to other embodiments, including those still to be developed in future. All that is essential is that the brightness filter modulates the brightness of the image to be displayed, thus being responsible, as it were, for the spatial part of the image representation (and, moreover, possibly also for the color structure of the image by the weighting of the primary colors at the relevant point).

The lamp is preferably based on the Xe excimer system, and thus generates a VUV excitation for appropriate fluorescent materials. Such discharges can be operated particularly well in a pulsed fashion, as is shown in a prior application whose disclosed content is included here (European Application 94 911 103.3). Such a pulsed mode of operation can be technically realised with the aid of electronic ballasts such as are described in the two prior applications 198 39 329.6 and 198 39 336.9. The disclosed content of these two applications is also included here. Precisely in the case of the flat applications, under consideration here in monitors or television screens, the pulsed mode of operation can be electronic ballasts described in the quoted applications offer very bright and at the same time very energy-efficient backlighting systems.

So far, primary colors have been talked of unspecifically in the plural. In fact, the invention already functions with the aid of two primary colors which can be used to give the impression of mixed colors. However, color displays in the narrow sense require at least three primary colors which are also usually employed, for example blue, red and green.

Furthermore, the invention in no way excludes the use of more than three primary colors as well, for example in order to optimize the color rendition.

As already previously stated, it is possible with the aid of discharge lamps for dielectrically impeded discharges in conjunction with modern liquid crystal systems to realise very short switching times, and this has the advantage of a flicker free and quasi continuous representation of fast moving images as well. According to the current prior art, cycle times, that is to say time periods per primary color, of the order of magnitude of approximately 1 ms and below are realistic. The invention is preferably directed to cycle times of at most 10, better 7, even better 4, and particularly 2 ms, or less.

Precisely with regard to short cycle times, it is advantageous to use a TFT matrix (thin film transistor matrix) for driving the liquid crystal device. However, the invention is not limited to this technology, firstly because short switching times need not be in the forefront with every application, and secondly because improvements are not to be ruled out even in the case of alternative technologies, and thirdly with regard to future technologies, currently not yet known, for driving liquid crystal displays.

Many variants are conceivable in principle as regards the concrete geometric shape of the discharge lamp. The invention is directed, in particular, to three possibilities, which are also represented further below as exemplary embodiments. In the case of the first possibility, the discharge lamp actually consists of a plurality of individual discharge lamps which respectively have an essentially elongated shape, in particular a tubular shape. Each of the elongated individual discharge lamps generates a dedicated dielectrically impeded discharge and is assigned to a specific primary color, that is to say to an appropriate fluorescent material. For this purpose, the fluorescent material can be fitted on the lamp itself or in the immediate vicinity on another element. Overall, the individual discharge lamps form an alternating arrangement in which all primary colors used occur in a spatially interlocked fashion.

This interlocking and the number of the individual discharge lamps for each primary color should be designed so as to produce as homogeneous as possible a luminance for each primary color, possibly with the assistance of optical aids such as diffusers. It is possible in this way to avoid strip-shaped or otherwise shaped color casts of the displayed image. For example, the alternating arrangement of the tubular discharge lamps can also be provided in a light box which is coated in a diffusely reflecting fashion. However, it is also conceivable to compensate irregularities by filters or else by driving the brightness filter.

The second possibility consists in the use of only a few individual discharge lamps which are, however, likewise essentially elongated, that is to say tubular, in particular. The light from these individual discharge lamps is launched into an optical conductor device which ensures homogeneous distribution over the surface of the liquid crystal device. For this purpose, the surface of the liquid crystal device corresponds essentially to that of the optical conductor device. For example, appropriate tubular discharge lamps can be provided at one, two or more lateral edges of a rectangular optical conductor device. Each individual one of the discharge lamps has along its length an alternating sequence of fluorescent materials corresponding to the primary colors used, and corresponding sections which can be driven electrically in groups.

In the case of the third variant, a flat lamp for dielectrically impeded discharges has a system of spatially interlocked electrode groups which can be operated separately and are respectively assigned to fluorescent sections for the primary colors. The separate operability does not presuppose that all the electrodes must be divided into groups. For example, it can suffice to split up only the cathodes or the anodes, or in the case of bipolar operation only the electrodes of a sign group, into electrically separate groups. A similar result is obtained as for the first variant, but this is done with a single discharge lamp.

As already indicated, it is preferred in each of the three cases to operate with additional optical devices for the purpose of homogenization, for example with diffusely scattering elements between the lamp and liquid crystal device or inside the lamp, or with diffusely reflecting surfaces.

Inhomogeneities in the light emission of the lamp can, however, be compensated by the liquid crystal device, specifically both permanently, for example by an appropriate pixel structure or by influencing the transmission in some other way, and electrically, that is to say by superimposing a compensating filter pattern.

The invention is represented in detail below with the aid of three exemplary embodiments. Individual features disclosed in this case can also be essential to the invention in other combinations. In detail:

DETAILED DESCRIPTION OF THE INVENTION

Figure 1:
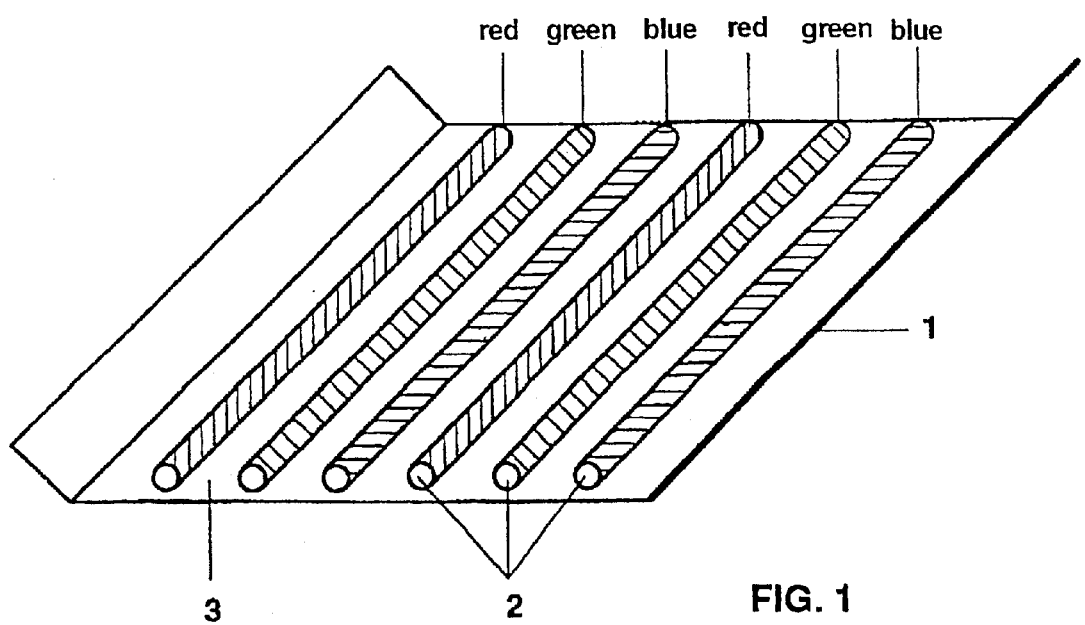
FIG. 1 shows a lamp for a color display according to the invention, in accordance with a first exemplary embodiment.

FIG. 1 shows a lamp for backlighting a liquid crystal device according to the first exemplary embodiment. A multiplicity of tubular elongated discharge lamps 2 for dielectrically impeded discharges are arranged in a light box 1 in parallel and at the same spacings from one another. The discharge lamps 2 are coated in alternating sequence with fluorescent materials for the colors of blue, green and red. Suitable fluorescent materials are, for example, disclosed in EP 94 911 105.8 (0 738 311). Overall, the light box 1 contains a relatively large number of parallel discharge lamps 2 of each individual color, FIG. 1 illustrating only in each case two discharge lamps 2 for each color, for the sake of simplicity.

The lamp represented can be driven appropriately to produce a temporal sequence of blue, then green, then red, then blue light again, etc. A relatively homogeneous luminance of the color respectively switched on is yielded in common with a diffuser in accordance with the explanations relating to FIG. 4 by a diffusely reflecting layer 3 on the side of the light box 1 facing the discharge lamps 2.

This exemplary embodiment can be constructed from basically conventional components given suitable selection of the fluorescent materials, but requires a relatively large number of individual discharge lamps 2.

Figure 2:
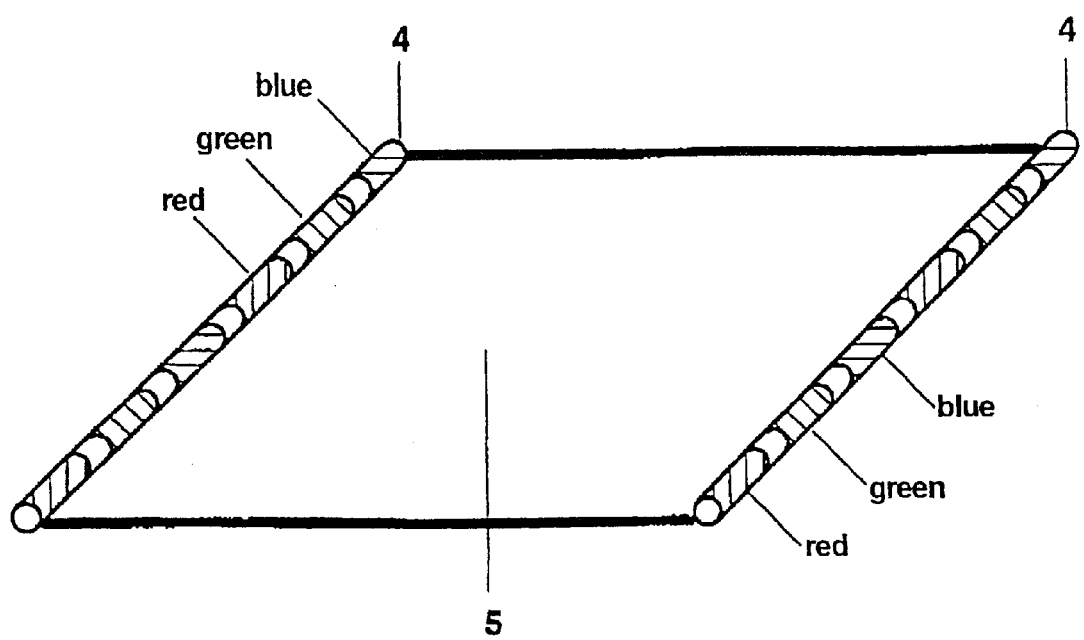
FIG. 2 shows a lamp for a color display according to the invention, in accordance with a second exemplary embodiment.

FIG. 2 shows an alternative to FIG. 1 as a second exemplary embodiment. In this variant, tubular elongated discharge lamps 4 for dielectrically impeded discharges, whose light is launched virtually completely into a flat optical conductor 5 with the aid of reflectors (not illustrated), are respectively arranged on two opposite longitudinally side edges of an optical conductor 5, which is essentially cuboid. Each of the discharge lamps 4 has a multiplicity of equally long line sections, which alternate along the line and in each case correspond to one of the three primary colors of blue, green and red. In this case, the primary colors change in an alternating fashion, as also in the first exemplary embodiment.

For this purpose, it is not only the case that the line sections are coated with a suitable fluorescent material; rather, it must be possible to switch the line sections of different colors independently of one another. This can be performed, for example, by the discharge lamps having external electrodes, that is to say for at least one sign group (anodes or cathodes). In the case of external electrodes, the discharge vessel wall, that is to say the tube wall of the discharge lamp 4, in this case, serves as dielectric impediment. The line sections for in each case one color can, of course, be interconnected, thus producing, in the final analysis, only three separate operating groups, one each for each color. Reference may be made to the prior art of 197 18 395.6 as regards technical details of tubular discharge lamps with dielectrically impeded discharges.

In operation, the line sections of in each case one color are simultaneously lit up, the colors alternating sequentially in time in the same way as in the first exemplary embodiment. The optical conductor 5 serves to deflect in the upward direction the light launched laterally. This is known in principle from conventional backlighting systems, for example for flat screens (so-called "edge-light type"). As an adjunct thereto, a diffusely reflecting coating (not illustrated) is provided on the side of the optical conductor 5 opposite the light emission side. This exemplary embodiment requires special discharge lamps 4, but these are not technically problematic. By contrast with the first exemplary embodiment, it has the advantage that a substantially smaller number of discharge lamps are required, in the present case two, although four are also possible. The optical conductor 5 simultaneously plays the role of an optical diffuser, and so the overall design can be very flat. The overall height is basically determined for the diameter of the discharge lamps 4 which is required for adequate power generation, and the minimum thickness, thereby prescribed, of the optical conductor 5 for the benefit of good light launching.

Figure 3:
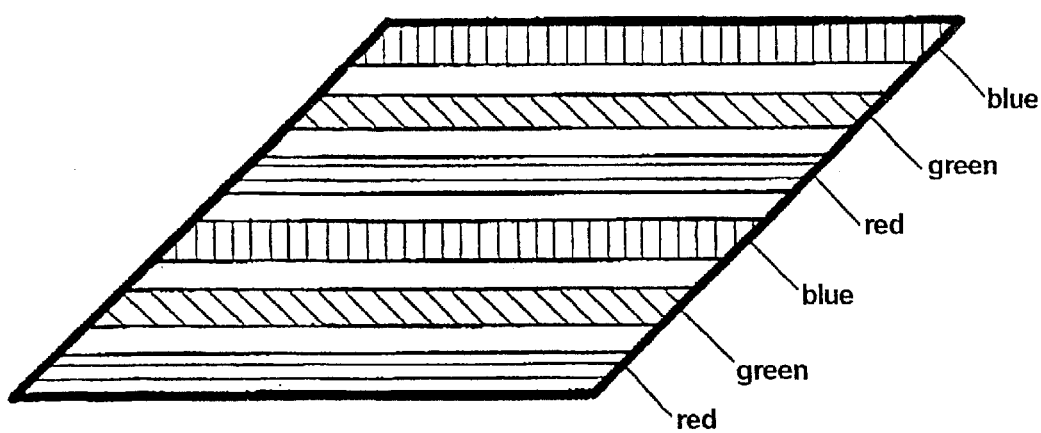
FIG. 3 shows a lamp for a color display according to the invention, in accordance with a third exemplary embodiment.

FIG. 3 shows a third exemplary embodiment. A standard flat radiator 6 which is designed for dielectrically impeded discharges is illustrated here. The flat radiator 6 is divided into strip sections 7 which in turn correspond in a spatially alternating fashion to the primary colors of blue, green and red, and are to be operated sequentially in time. For this purpose, in addition to an appropriate fluorescent coating in the region of the strip section provision is made in each strip section of corresponding electrode structures which permit strips of different color membership to be operated separately. In this case, electrodes of all the strips of the same color can, in turn, be interconnected. In principle, this structure corresponds to a two-dimensional expansion of the tubular lamps from FIG. 2, a transition having been made from a narrow elongated tube geometry to a flat radiator. Given suitably fine subdivision into the strip section 7, the human eye scarcely perceives any fluctuation in the luminance after passage through the liquid crystal device. It is also to be borne in mind here that the luminance maxima and luminance minima are not constant in space, because of the temporally sequential switching over, and this is enough, in itself, for them to be scarcely perceptible to the eye.

However, it is also possible, in addition, to use an optical diffuser, for example a frosted glass pane or plastic pane, in order to homogenize the luminance distribution further. This is illustrated diagrammatically in FIG. 4, in which the flat radiator 6 from FIG. 3 appears in the lower region in cross section. The strip sections 7 are drawn in as juxtaposed sections of the discharge volume, although in fact there are here no actual separated discharge chambers, but only operationally separated electrode groups (at least of one type of sign) and alternating fluorescent coatings.

Figure 4:
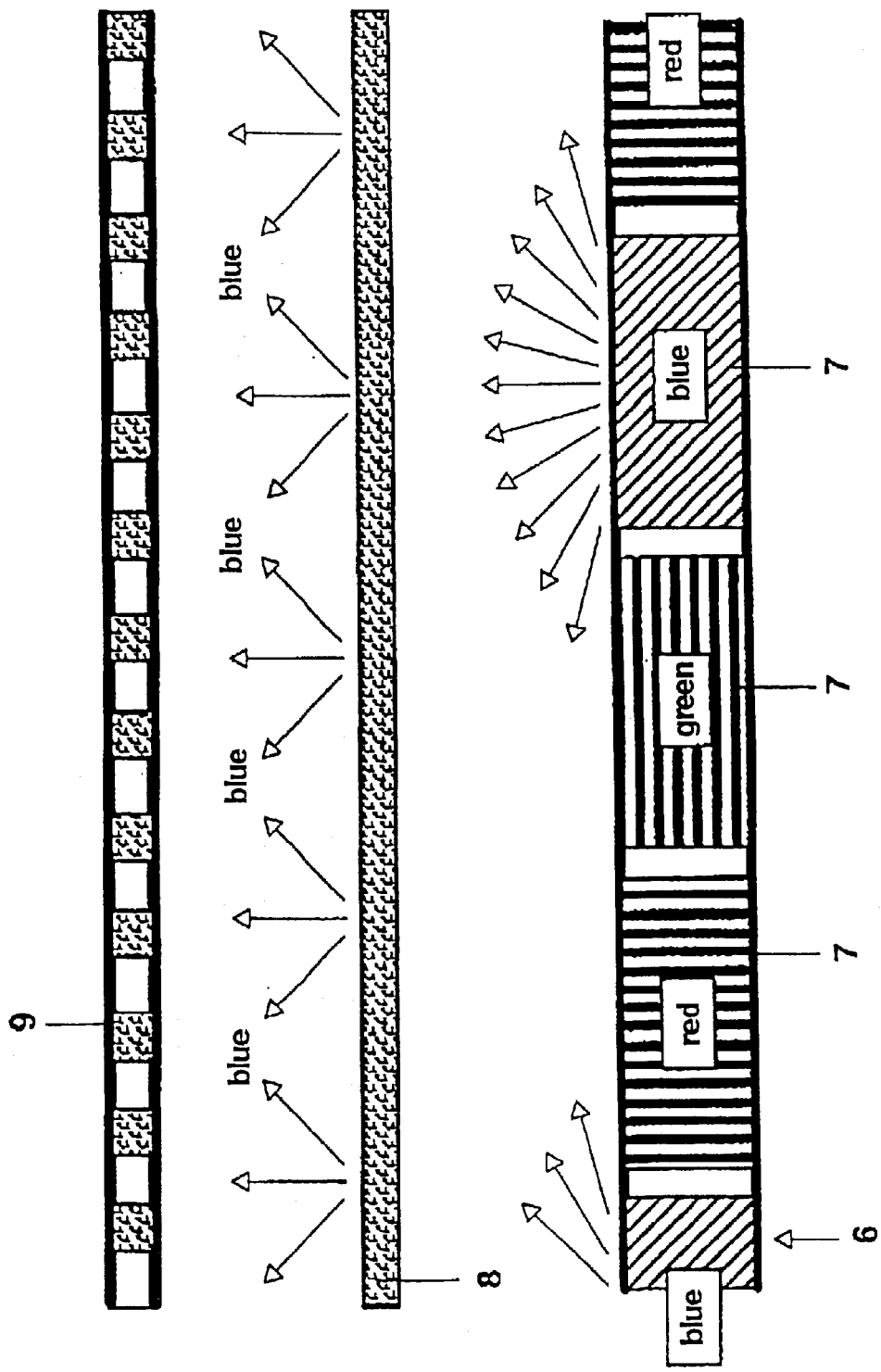
FIG. 4 shows a cross-sectional illustration of the principle of the design of the color display according to the invention, in accordance with the third exemplary embodiment.

The upper side of the flat radiator 6 is the light emitting side, FIG. 4 symbolizing the situation in which the blue strip sections 7 are active. The lower side, that is to say the side of the flat radiator 6 opposite the light emitting side can be provided with reflecting layers. The light emerging upwards passes through a diffuser which is denoted by 8 and contributes to a statistical homogenization of the light, blue light in the case of FIG. 4, from the flat radiator 6 owing to multiple refraction and/or reflection processes. A substantial portion of the homogenized light emerges upwards and thereby backlights a liquid crystal device denoted by 9. A lesser portion of the homogenized light also emerges downwards in some circumstances, and is then retroreflected at least partially by the reflecting layer of the flat radiator.

The liquid crystal device contains a fine structure of separately controllable liquid crystal cells which can be used to control the brightness distribution exhibited by the blue light transmitted by the liquid crystal device 9. A two-dimensional blue image is thereby produced. By virtue of the fact that the brightness distributions of corresponding red and green images alternate with the blue image, the human eye actually perceives an additive color mixing of the temporary sequential primary color images in a physiological temporal averaging process. Consequently, in addition to the purely figurative representation of the overall image, the liquid crystal device 9 must also be driven with regard to the correct color distribution. For example, in the case of an image of a display which remains constant in a purely figurative fashion, it must appear brighter at corresponding blue-dominated sites of the image in the "blue phase" from FIG. 4, depending on the color distribution in the overall image, and darker in the red phase and green phase, as vice versa at other sites, in a fashion tuned to the primary color distribution of the color at the respective site.

Of course, this does not preclude that the lamp 6 could also be used for color determination. For example, flat color displacements could be corrected by driving the primary colors differently as appropriate in the lamp 6. Conversely, of course, it would also be possible for residual inhomogeneities in the light emission of the lamp 6, for example when no diffuser 8 is used, to be filtered out by a compensating drive of the liquid crystal device 9. It is also possible, in particular, in this case to ensure that the inhomogeneities for the primary colors do not coincide.

The liquid crystal device is preferably a liquid crystal which is basically an antiferroelectric one. Reference may be made in this connection to the relevant prior art, for example Hisashi Aoki, "TFT Driving Opens the Way for Gray Shade Expression" in Nikkei Microdevices Flat Panel Display 1999 Yearbook", pages 165 ff.

Over all, the invention offers the substantial advantage that the liquid crystal device 9—or, more generally, a spatially controllable brightness filter 9—need be tuned in punctiform resolution only to the required spatial resolution of the display. There is no longer a need for subdivision of image pixels into primary color surfaces nor for color filtering. Consequently, it is possible, firstly, to improve the spatial resolution or, secondly, to reduce the costs for the liquid crystal device 9. Furthermore, the brightness of the color display is better because the filter losses are eliminated, the losses in the liquid crystal display 9 because of the conventional subdivision in primary color patches (aperture loss owing to subpixel subdivision) are eliminated, and the discharge lamp 6 permits backlighting with a very high luminance. Finally, discharge lamps for dielectrically impeded discharges have exceptionally stable switching performance and can be operated effectively in a pulsed fashion, and are much more cost effective than LED arrays, precisely in the case of larger surfaces.

What is claimed is:

1. A color display comprising a spatially controllable brightness filter and a backlight, the backlight comprising a flat optical conductor and at least one discharge lamp, the optical conductor having a light emission side, a side opposite the light emission side, and side edges, the light emission side of the optical conductor facing the spatially controllable brightness filter and each discharge lamp being disposed along a side edge of the optical conductor;

the display being capable of producing images in at least two primary colors alternating sequentially in time in order to create the impression of a color image with mixed colors of the primary colors; and each discharge lamp having alternating sections of fluorescent material corresponding to the primary colors, the sections of fluorescent material corresponding to the same primary color being driven electrically in groups and independently from the sections corresponding to the other primary color(s) so that the sections corresponding to the same primary color are simultaneously lit up and the primary colors can be changed in an alternating fashion.

2. The color display of claim 1 wherein the discharge lamp(s) have at least one dielectrically impeded electrode.

3. The color display of claim 2 wherein the discharge lamp(s) have an elongated tubular discharge vessel and the dielectrically impeded electrode(s) are external electrodes wherein the wall of the discharge vessel serves as the dielectric impediment.

4. The color display of claim 2 wherein the primary colors are red, green and blue.

5. The color display of claim 1 wherein the side opposite the light emission side has a diffusely reflecting coating.

6. A color display comprising a spatially controllable brightness filter and a backlight, the backlight comprising a flat rectangular optical conductor and at least one discharge lamp, the optical conductor having a light emission side, a side opposite the light emission side, and side edges, the light emission side of the optical conductor facing the spatially controllable brightness filter and each discharge lamp being disposed along a side edge of the optically conductor;

the display being capable of producing images in at least two primary colors alternating sequentially in time in order to create the impression of a color image with mixed colors of the primary colors; and each discharge lamp having an elongated tubular discharge vessel with alternating sections of fluorescent material along the length of the vessel, the sections of fluorescent material corresponding to the primary colors, the sections of fluorescent material corresponding to the same primary color being driven electrically in groups and independently from the sections corresponding to the other primary color(s) so that the sections corresponding to the same primary color are simultaneously lit up and the primary colors can be changed in an alternating fashion.

7. The color display of claim 6 wherein the discharge lamp(s) have at least one dielectrically impeded electrode.

8. The color display of claim 7 wherein the dielectrically impeded electrode(s) are external electrodes wherein the wall of the discharge vessel serves as the dielectric impediment.

9. The color display of claim 6 wherein the primary colors are red, green and blue.

10. The color display of claim 6 wherein the backlight has two discharge lamps disposed along opposite side edges of the optical conductor.

11. The color display of claim 10 wherein each discharge lamp has at least one dielectrically impeded electrode.

12. The color display of claim 11 wherein the dielectrically impeded electrodes are external electrodes wherein the wall of each discharge vessel serves as the dielectric impediment.

13. The color display of claim 10 wherein the primary colors are red, green and blue.

* * * * *